J. H. MINER.
FLANGE LUBRICATOR.
APPLICATION FILED JUNE 7, 1917.
1,269,300.
Patented June 11, 1918.
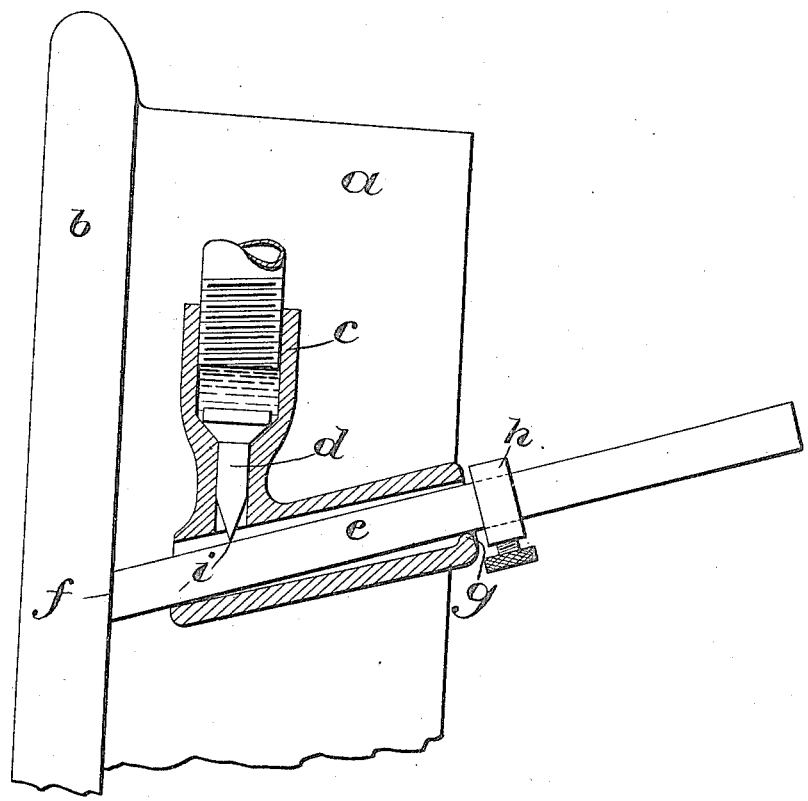
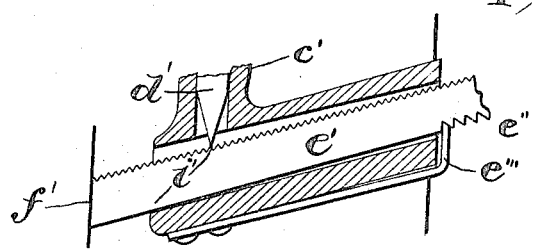
Inventor:
James H. Miner
by Spear, Middleton, Donaldson & Spear
Atty's.

UNITED STATES PATENT OFFICE.

JAMES H. MINER, OF LUMBERTON, MISSISSIPPI.

FLANGE-LUBRICATOR.

1,269,300.     Specification of Letters Patent.     Patented June 11, 1918.

Application filed June 7, 1917. Serial No. 173,319.

*To all whom it may concern:*

Be it known that I, JAMES H. MINER, of Lumberton, Mississippi, have invented certain new and useful Improvements in Flange-Lubricators, of which the following is a specification.

My invention is a flange lubricator and is designed to provide a sensitive valve to control the flow of lubricant to the flange.

The invention is shown in the drawing partly in side elevation and partly in section in Figure 1, while Fig. 2 shows another form of the invention. In Fig 1 the wheel is shown at $a$ with the flange at $b$, and a suitable lubricant is supplied through a pipe connection to the casing $c$, which contains a valve $d$ controlling the supply of lubricant to the flange and which valve is actuated to allow the discharge of the lubricant by the lifting action of a bar $e$, supported in an inclined position with its end $f$ bearing normally against the flange of the wheel. The bar $e$ has a pivotal mounting as at $g$ and by means of an adjustable weight $h$ it is balanced so that in the movement of the wheel the bar is oscillated up and down, and in this movement comes in contact with the end $i$ of the valve $d$ and lifts it sufficiently to allow a certain amount of the lubricant to flow out. When the parts are at rest it will be observed that the bar $e$ will be out of contact with the valve and no oil will flow. The adjustable weight $n$ can be used to balance the parts nicely.

In Fig. 2 I have shown a modification in which the bar $e'$ is notched on its upper face so as to positively engage the point $i'$ of the valve $d'$. In the oscillation of the bar $e'$ and to raise it sufficiently to allow the lubricant to flow, the teeth are so formed as to permit the mounting of the pin $i'$ of the valve over the teeth. In this connection in order to insure the lifting of the valve I offer a slight resistance to the rearward movement of the bar $e'$ by notching this bar, as shown at $e''$ and engaging it with a spring detent $e'''$ so that the oil will not flow too freely and it will require more or less of a positive push on the end of the bar $e'$ by the flange of the wheel to cause the lubricating action and this may be adjusted as desired.

What I claim is:

1. In a flange oiler, a vertically movable controlling lubricant feed valve, an oscillating inclined bar extending beneath the valve and adapted to be actuated by the movement of the wheel flange to positively raise said valve, and means for maintaining the bar against the wheel flange, substantially as described.

2. In a flange lubricator a valve controlling the lubricant feed, a sliding bar adapted to be actuated by the movement of the wheel flange to positively raise said valve, said bar being provided with means for slightly resisting the pushing action of the flange, substantially as described.

In testimony whereof, I affix my signature.

JAMES H. MINER.

Witnesses:
J. L. ROGERS,
A. B. EASTMAN.

Copies of this patent may be obtained for five cents each, by addressing the "Commissioner of Patents, Washington, D. C."